United States Patent
Krause et al.

(10) Patent No.: US 10,604,067 B2
(45) Date of Patent: Mar. 31, 2020

(54) SYSTEM AND METHOD FOR CONTROLLING VEHICLE SEATING ARRANGEMENT

(71) Applicants: Hyundai Motor Company, Seoul (KR); Kia Motors Corporation, Seoul (KR)

(72) Inventors: Margaux Krause, Pinckney, MI (US); Chadd Price, Livonia, MI (US)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

(21) Appl. No.: 16/116,033

(22) Filed: Aug. 29, 2018

(65) Prior Publication Data

US 2020/0070715 A1    Mar. 5, 2020

(51) Int. Cl.
| | |
|---|---|
| *B60Q 1/00* | (2006.01) |
| *B60Q 1/50* | (2006.01) |
| *G01C 21/34* | (2006.01) |
| *B60Q 9/00* | (2006.01) |
| *G06Q 30/02* | (2012.01) |
| *B60R 25/20* | (2013.01) |
| *G06K 9/00* | (2006.01) |
| *B60Q 1/26* | (2006.01) |

(52) U.S. Cl.
CPC .............. *B60Q 1/50* (2013.01); *B60Q 1/2669* (2013.01); *B60Q 9/00* (2013.01); *B60R 25/20* (2013.01); *G01C 21/343* (2013.01); *G06K 9/00791* (2013.01); *G06Q 30/0226* (2013.01)

(58) Field of Classification Search
CPC .......... B60Q 1/50; B60Q 1/2669; B60Q 9/00; B60R 25/20; G01C 21/343; G01C 21/00791; G06K 9/00791; G06Q 30/0226
USPC ......................................................... 340/438
See application file for complete search history.

(56) References Cited

U.S. PATENT DOCUMENTS

| | | | |
|---|---|---|---|
| 7,333,021 B2 | 2/2008 | Ieda et al. | |
| 7,812,716 B1* | 10/2010 | Cotter | B60Q 1/50 340/457.1 |
| 8,054,203 B2* | 11/2011 | Breed | B60C 11/24 340/931 |
| 10,189,434 B1* | 1/2019 | Casaburo | G01C 21/3664 |
| 2004/0026947 A1* | 2/2004 | Kitano | B60R 7/04 296/24.34 |
| 2008/0252413 A1* | 10/2008 | Ikeda | G06Q 30/02 340/5.2 |
| 2008/0318655 A1* | 12/2008 | Davies | G07F 17/32 463/16 |
| 2009/0063204 A1* | 3/2009 | Stirlen | G06Q 10/02 705/5 |

(Continued)

*Primary Examiner* — Kerri L McNally
*Assistant Examiner* — Thang D Tran
(74) *Attorney, Agent, or Firm* — Mintz Levin Cohn Ferris Glovsky and Popeo, P.C.; Peter F. Corless (57) ABSTRACT

A method for controlling a vehicle seating arrangement can include: detecting a current seat occupancy in a vehicle using a plurality of sensors installed in the vehicle; identifying a seat of the vehicle for a future passenger to occupy based on the detected current seat occupancy; unlocking, by an electronic control unit (ECU) of the vehicle, a door of the vehicle adjacent to the identified seat; and activating, by the ECU, a light of the vehicle proximate to the identified seat.

17 Claims, 6 Drawing Sheets

(56) References Cited

U.S. PATENT DOCUMENTS

| | | | | |
|---|---|---|---|---|
| 2009/0063208 A1* | 3/2009 | Stirlen | G06Q 10/02 | 705/6 |
| 2012/0074841 A1* | 3/2012 | Liu | B60Q 1/2611 | 315/77 |
| 2012/0106182 A1* | 5/2012 | Minter | B60Q 1/2669 | 362/501 |
| 2013/0030645 A1* | 1/2013 | Divine | B60K 35/00 | 701/36 |
| 2013/0238167 A1* | 9/2013 | Stanfield | G08G 1/20 | 701/2 |
| 2013/0297281 A1* | 11/2013 | Niemeyer | G06F 17/5009 | 703/20 |
| 2014/0052482 A1* | 2/2014 | Le Marier | G06Q 10/02 | 705/5 |
| 2014/0257879 A1* | 9/2014 | Sink | G06Q 10/02 | 705/5 |
| 2015/0051927 A1* | 2/2015 | Dueser | G06Q 10/02 | 705/5 |
| 2015/0149042 A1* | 5/2015 | Cooper | B60R 16/037 | 701/48 |
| 2015/0354978 A1* | 12/2015 | Gerlach | G06F 16/29 | 701/424 |
| 2016/0027306 A1* | 1/2016 | Lambert | G08G 1/123 | 701/117 |
| 2016/0138305 A1* | 5/2016 | Noguchi | E05B 81/58 | 70/263 |
| 2016/0257324 A1* | 9/2016 | Kono | B61L 25/021 | |
| 2017/0158023 A1* | 6/2017 | Stevanovic | B60H 1/00771 | |
| 2017/0203634 A1* | 7/2017 | Dickow | B60H 1/00742 | |
| 2017/0232884 A1* | 8/2017 | Watase | G09G 3/3406 | 315/82 |
| 2018/0039917 A1* | 2/2018 | Buttolo | G01C 21/3438 | |
| 2018/0264975 A1* | 9/2018 | Bonk | B60N 2/0228 | |
| 2018/0275648 A1* | 9/2018 | Ramalingam | G05D 1/0027 | |
| 2018/0364062 A1* | 12/2018 | Wang | G01C 21/3484 | |
| 2019/0049090 A1* | 2/2019 | Krishnan | B60Q 1/2669 | |

* cited by examiner

SYSTEM AND METHOD FOR CONTROLLING VEHICLE SEATING ARRANGEMENT

TECHNICAL FIELD

The present disclosure relates generally to vehicular technologies, and more particularly, to systems and methods for controlling a vehicle seating arrangement.

BACKGROUND

Recently, multi-passenger or carpooling ride-hailing services have grown increasingly popular. These services usually involve the driver of a vehicle following a navigation route to pick-up and drop-off several passengers with similar routes. Typically, the ride-hailing passengers randomly choose their seats within the vehicle.

Figure 1:
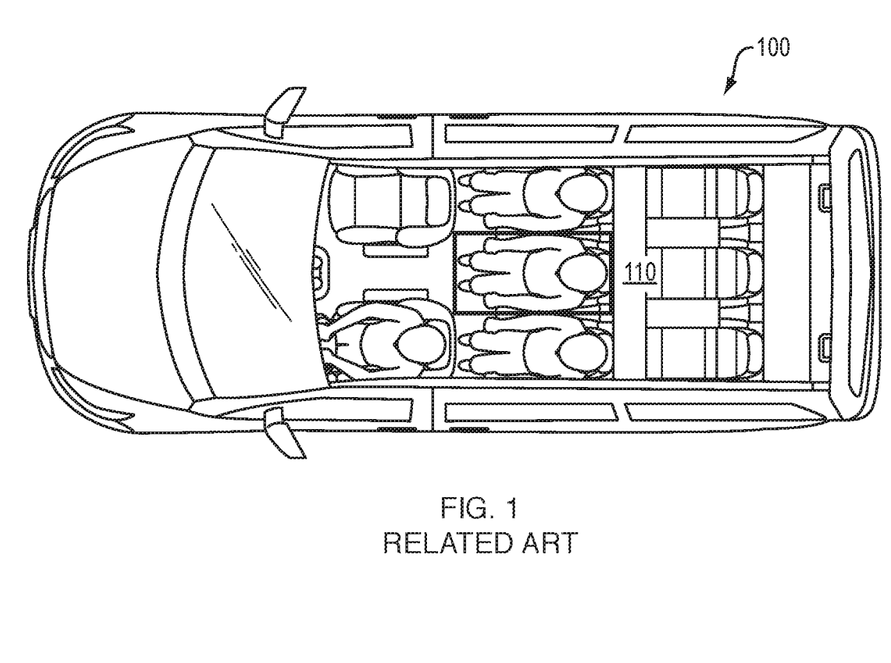
FIG. 1 is a top view of a vehicle including a conventional vehicle seating arrangement.

However, several problems can arise as a result of the passengers' seat occupancy. First, passengers can choose a seat that impedes entry of a future passenger or exit of a current passenger, as demonstrated in FIG. 1. As shown in FIG. 1, a current passenger 110 located in the middle of the vehicle's middle row needs to exit the vehicle 100, but is blocked by other passengers located on both sides. In order for the current passenger 110 to exit the vehicle 100, one of the other passengers must temporarily exit the vehicle 100 to allow the current passenger 110 to leave, and then re-enter the vehicle 100 to reach his destination.

Second, passengers or cargo (e.g., a child's car seat, a package, luggage, etc.) often occupy seats of the vehicle. However, a future passenger can be unaware of the seats which are occupied. As a result, it can be time-consuming and generally problematic for the future passenger to determine where to sit and which vehicle door to enter when he is picked up.

Third, passengers can occupy a seat of the vehicle against the preference of the driver. For instance, when a single passenger is in the vehicle, the driver could prefer that the passenger is located in either the front row or the back row. However, the passenger can be unaware of such preference, and thus occupy a seat against the driver's desired arrangement.

SUMMARY

The present disclosure provides systems and methods for controlling a vehicle seating arrangement in which exterior and/or interior indicators, such as lights and door locks, are utilized to quickly inform a passenger of an optimal door to enter and seat to occupy. A plurality of sensors can be installed in the vehicle and utilized to detect a current seat occupancy of the vehicle. Based on the current seat occupancy, an optimal seat for a future passenger to occupy can be identified. Various parameters can be considered in identifying the optimal seat, such as a stored profile of the passenger, traffic conditions, weather conditions, and others. Then, an electronic control unit (ECU) of the vehicle can control exterior and/or interior vehicle indicators to guide the future passenger when entering the vehicle. For instance, the ECU can unlock a door adjacent to the identified seat, and also activate a light of the vehicle proximate to the identified seat. Thus, it can be immediately clear for the passenger which door to enter and seat to occupy upon pick-up. Moreover, passengers can be arranged within the vehicle in a manner allowing for efficient entry and exit throughout each passenger's trip.

According to embodiments of the present disclosure, a method for controlling a vehicle seating arrangement can include: detecting a current seat occupancy in a vehicle using a plurality of sensors installed in the vehicle; identifying a seat of the vehicle for a future passenger to occupy based on the detected current seat occupancy; unlocking, by an electronic control unit (ECU) of the vehicle, a door of the vehicle adjacent to the identified seat; and activating, by the ECU, a light of the vehicle proximate to the identified seat.

The method for controlling a vehicle seating arrangement can further include: generating an optimal future seat occupancy in the vehicle based on the current seat occupancy and at least one additional parameter; and identifying the seat for the future passenger to occupy based on the optimal future seat occupancy.

The generating of the optimal future seat occupancy can include: accessing a stored profile of the future passenger including personal information of the future passenger; and generating the optimal future seat occupancy based on information in the profile of the future passenger.

The generating of the optimal future seat occupancy can further include: generating the optimal future seat occupancy based on information in the profile of the future passenger selected from a group consisting of: a height of the future passenger, a weight of the future passenger, an age of the future passenger, a gender of the future passenger, a riding preference of the future passenger, a friendship of the future passenger with another passenger in the vehicle, and loyalty points of the future passenger.

Also, the generating of the optimal future seat occupancy can further include: determining a ride cost paid for by the future passenger; and generating the optimal future seat occupancy based on the ride cost.

Also, the generating of the optimal future seat occupancy can further include: determining a current traffic condition; and generating the optimal future seat occupancy based on the current traffic condition.

Also, the generating of the optimal future seat occupancy can further include: determining a current weather condition; and generating the optimal future seat occupancy based on the current weather condition.

Also, the generating of the optimal future seat occupancy can further include: determining route data for each current passenger in the vehicle and one or more future passengers; generating a trip schedule based on the route data, the trip schedule indicating an order of passenger pick-ups and drop-offs; and generating the optimal future seat occupancy based on the trip schedule.

The generating of the trip schedule can include: generating the optimal future seat occupancy such that a passenger among each current passenger and the one or more future passengers being dropped off next according to the trip schedule is located in a seat adjacent to a curbside door of the vehicle.

Also, the generating of the optimal future seat occupancy can further include: determining a passenger location preference of a driver of the vehicle; and generating the optimal future seat occupancy based on the passenger location preference of the driver.

The method for controlling a vehicle seating arrangement can further include: displaying an indication of the optimal future seat occupancy via a display unit installed in the vehicle.

Also, the method for controlling a vehicle seating arrangement can further include: receiving an indication of a desired seat occupancy from a driver of the vehicle; and modifying the optimal future seat occupancy in accordance with the desired seat occupancy.

When the future passenger is one of a plurality of future passengers, the generating of the optimal future seat occupancy can further include: determining whether the vehicle is capable of seating the plurality of future passengers; in response to determining that the vehicle is not capable of seating the plurality of future passengers, requesting a second vehicle to assist the vehicle; and generating the optimal future seat occupancy based on a total seating capacity of the vehicle and the second vehicle.

The method for controlling a vehicle seating arrangement can further include: locking, by the ECU, doors of the vehicle other than the door adjacent to the identified seat.

The activating of the light can include: activating, by the ECU, a light coupled to a door handle of the door adjacent to the identified seat.

Also, the activating of the light can include: activating, by the ECU, an interior light of the vehicle proximate to the identified seat.

Also, the activating of the light can include: activating, by the ECU, the light so as to emit light of a predetermined first color.

The method for controlling a vehicle seating arrangement can further include: activating, by the ECU, one or more lights of the vehicle other than the light proximate to the identified seat so as to emit light of a predetermined second color different from the first color.

Also, the activating of the light can include: activating, by the ECU, the light so as to emit light of a predetermined first pattern.

The method for controlling a vehicle seating arrangement can further include: activating, by the ECU, one or more lights of the vehicle other than the light proximate to the identified seat so as to emit light of a predetermined second pattern different from the first pattern.

Also, the activating of the light can include: accessing a stored profile of the future passenger including personal information of the future passenger; and activating, by the ECU, the light so as to emit light of a color indicated in the profile of the future passenger.

The method for controlling a vehicle seating arrangement can further include: determining whether the future passenger will enter the vehicle at a future point in time; and detecting the current seat occupancy in the vehicle in response to determining that the future passenger will enter the vehicle at the future point in time.

The determining whether the future passenger will enter the vehicle can include: acquiring an image of a surrounding environment using a camera mounted on an exterior of the vehicle; and determining whether the future passenger will enter the vehicle based on the acquired image.

Also, the determining whether the future passenger will enter the vehicle can include: receiving information from a mobile device of the future passenger; and determining whether the future passenger will enter the vehicle based on the received information.

Also, the determining whether the future passenger will enter the vehicle can include: receiving input from a driver of the vehicle; and determining whether the future passenger will enter the vehicle based on the received input.

The detecting of the current seat occupancy can include: detecting whether seats of the vehicle are occupied using information received from one or more mobile devices of one or more passengers of the vehicle.

Also, the detecting of the current seat occupancy can include: detecting whether seats of the vehicle are occupied by passengers and whether the seats are occupied by cargo.

Also, the detecting of the current seat occupancy can include: detecting whether seats of the vehicle are occupied using information received from seat occupancy sensors installed in the seats of the vehicle.

Also, the detecting of the current seat occupancy can include: detecting whether seats of the vehicle are occupied using information received from cameras mounted in the vehicle.

Also, the detecting of the current seat occupancy can include: detecting whether seats of the vehicle are occupied using information received from door handle sensors installed in the vehicle.

The method for controlling a vehicle seating arrangement can further include: detecting whether the future passenger has entered the vehicle using the plurality of sensors; and after detecting the future passenger has entered the vehicle: locking, by the ECU, the door adjacent to the identified seat, and deactivating, by the ECU, the light proximate to the identified seat.

Also, the method for controlling a vehicle seating arrangement can further include: detecting whether the future passenger has entered the vehicle using the plurality of sensors; and when a predetermined time elapses without detecting the future passenger has entered the vehicle: locking, by the ECU, the door adjacent to the identified seat, and deactivating, by the ECU, the light proximate to the identified seat.

Also, the method for controlling a vehicle seating arrangement can further include: displaying an indication of the identified seat via a display unit installed in the vehicle.

Also, the method for controlling a vehicle seating arrangement can further include: detecting whether the future passenger has opened a door of the vehicle other than the door adjacent to the identified seat; and in response to detecting the future passenger has opened the door other than the door adjacent to the identified seat, outputting a warning message to the future passenger via a speaker installed in the vehicle.

Also, the method for controlling a vehicle seating arrangement can further include: detecting whether the future passenger has entered the vehicle using the plurality of sensors; and after detecting the future passenger has entered the vehicle, updating a stored profile of the future passenger so as to reflect that the future passenger occupied the identified seat.

Also, the method for controlling a vehicle seating arrangement can further include: detecting whether the future passenger is located within a predetermined distance of the vehicle; and in response to detecting that the future passenger is located within the predetermined distance: unlocking, by the ECU, the door adjacent to the identified seat; and activating, by the ECU, the light proximate to the identified seat.

The detecting whether the future passenger is located within the predetermined distance can include: acquiring an image of a surrounding environment using a camera mounted on an exterior of the vehicle; and detecting whether the future passenger is located within the predetermined distance based on the acquired image.

Also, the detecting whether the future passenger is located within the predetermined distance can include: receiving information from a mobile device of the future passenger;

and detecting whether the future passenger is located within the predetermined distance based on the received information.

The method for controlling a vehicle seating arrangement can further include: prior to the future passenger entering the vehicle, generating an optimal current seat occupancy in the vehicle based on at least one parameter.

Also, the method for controlling a vehicle seating arrangement can further include: when the detected current seat occupancy does not match the optimal current seat occupancy, outputting a request to one or more passengers in the vehicle to relocate within the vehicle in accordance with the optimal current seat occupancy.

The outputting of the request to the one or more passengers can include: outputting the request to one or more passengers via one or more of speakers installed in the vehicle and a display unit installed in the vehicle.

The generating of the optimal current seat occupancy can include: accessing one or more stored profiles of one or more passengers in the vehicle including personal information of the one or more passengers; and generating the optimal current seat occupancy based on information in the one or more profiles of the one or more passengers.

Furthermore, in accordance with embodiments of the present disclosure, a system for controlling a vehicle seating arrangement can include: a vehicle including a plurality of seats and a plurality of lights; a plurality of sensors installed in the vehicle; and at least one electronic control unit (ECU) of the vehicle. One or more of the at least one ECU can be configured to: detect a current seat occupancy in the vehicle using information sensed from the plurality of sensors; identify a seat of the vehicle for a future passenger to occupy based on the detected current seat occupancy; unlock a door of the vehicle adjacent to the identified seat; and activate a light of the vehicle proximate to the identified seat.

Furthermore, in accordance with embodiments of the present disclosure, a non-transitory computer readable medium can contain program instructions for controlling a vehicle seating arrangement. When the program instructions are executed by one or more of at least one electronic control unit (ECU) of a vehicle, the one or more ECUs can be caused to: detect a current seat occupancy in the vehicle using information sensed from a plurality of sensors installed in the vehicle; identify a seat of the vehicle for a future passenger to occupy based on the detected current seat occupancy; unlock a door of the vehicle adjacent to the identified seat; and activate a light of the vehicle proximate to the identified seat.

BRIEF DESCRIPTION OF THE DRAWINGS

The embodiments herein may be better understood by referring to the following description in conjunction with the accompanying drawings in which like reference numerals indicate identically or functionally similar elements, of which.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Hereinafter, embodiments of the present disclosure will be described in detail with reference to the accompanying drawings. As those skilled in the art would realize, the described embodiments may be modified in various different ways, all without departing from the spirit or scope of the present disclosure. Further, throughout the specification, like reference numerals refer to like elements.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles, in general, such as passenger automobiles including sports utility vehicles (SUV), buses, trucks, various commercial vehicles, watercraft including a variety of boats and ships, aircraft, and the like, and includes hybrid vehicles, electric vehicles, hybrid electric vehicles, hydrogen-powered vehicles and other alternative fuel vehicles (e.g., fuels derived from resources other than petroleum).

Additionally, it is understood that one or more of the below methods, or aspects thereof, may be executed by at least one control unit (or electronic control unit (ECU)). The term "control unit" may refer to a hardware device that includes a memory and a processor. The memory is configured to store program instructions, and the processor is specifically programmed to execute the program instructions to perform one or more processes which are described further below. The control unit may control operation of units, modules, parts, or the like, as described herein. Moreover, it is understood that control unit may be installed in a vehicle, as described herein, or located externally (e.g., a server) in remote communication with the vehicle, as would be appreciated by a person of ordinary skill in the art.

Furthermore, the control unit of the present disclosure may be embodied as non-transitory computer readable media containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed throughout a computer network so that the program instructions are stored and executed in a distributed fashion, e.g., by a telematics server or a Controller Area Network (CAN).

Referring now to embodiments of the present disclosure, systems and methods described herein for controlling a vehicle seating arrangement can utilize a combination of indicators, such as lights and door locks, to quickly inform a passenger of an optimal door to enter and seat to occupy when the vehicle arrives to pick-up the passenger. Moreover, passengers can be arranged so as to occupy seats within the vehicle in a manner allowing for efficient entry and exit throughout each passenger's trip.

Figure 2:
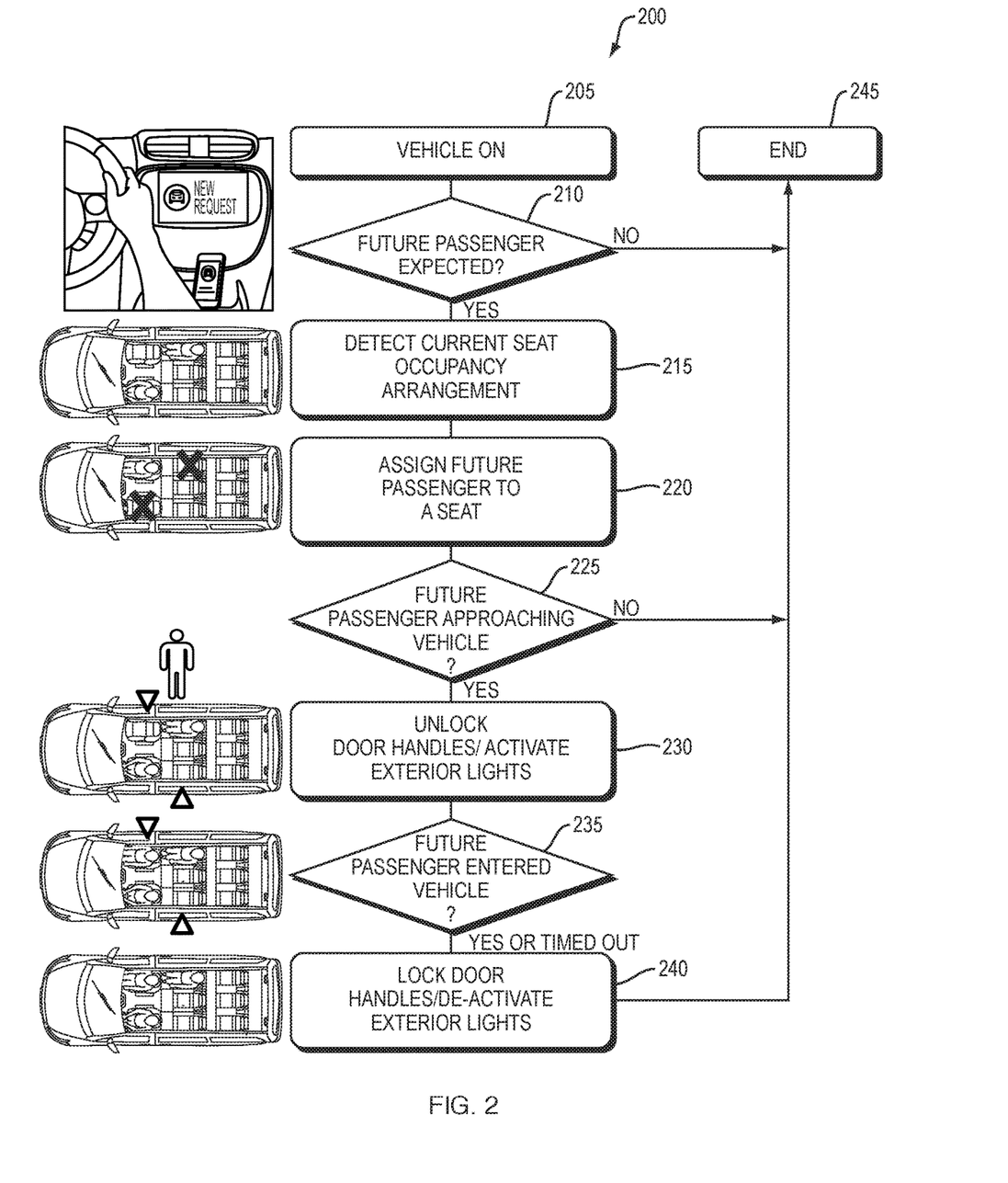
FIG. 2 is a flowchart of an example method for controlling a vehicle seating arrangement.

In detail, FIG. 2 is a flowchart of an example method for controlling a vehicle seating arrangement. The procedure 200 may start at step 205, and continue to step 210, where, as described in greater detail below, an optimal seat 310 in a vehicle 300 for a future passenger 320 to occupy can be identified based on various parameters, and indicators to assist the passenger 320 in quickly ascertaining the identified seat 310 can be provided. The steps of procedure 200 may be performed by one or more ECUs in operative communication with components of the vehicle 300. Although multiple or different ECUs can be employed to perform the operations described below, a single ECU will be referenced for the purpose of simplicity.

To aid in the understanding of the example method for controlling a vehicle seating arrangement, left of the flowchart in FIG. 2 is a simplified, diagrammatic representation of the procedure 200.

At step 205, a vehicle 300 can be turned on by a driver 330. The vehicle 300 can, for example, provide ride-sharing and/or car-pooling services. That is, the vehicle 300 can be used to transport passengers from an origin to a destination. The ride-sharing or car-pooling service can be a paid service, through various well-known ride-sharing businesses, or a free service. The vehicle 300 can include a plurality of seats to accommodate a plurality of passengers. The vehicle 300 can also include a plurality of lights and door locks, as is generally known in the art. The vehicle 30 can be equipped with communication equipment such as a transmitter and receiver for performing communication with external entities, e.g., a remote server, a mobile device of a user, another vehicle, etc. The vehicle 300 can further include one or more ECUs installed therein for controlling operation of various components of the vehicle 300, such as lights, locks, communication, and so forth.

At step 210, the ECU can determine whether a passenger 320 (i.e., a new passenger or a future passenger) will enter a vehicle 300 at a future point in time. The ECU can determine whether the future passenger 320 will enter the vehicle 300 in various ways. For example, an image of a surrounding environment of the vehicle 300 can be acquired using one or more cameras (not shown) mounted on an exterior of the vehicle 300. The one or more cameras mounted on the vehicle 300 can include, for instance, a "surround-view" camera. The ECU can make a determination of whether the future passenger 320 will enter the vehicle 300 based on the acquired image(s). For instance, the ECU can employ an image processing algorithm on the acquired image(s) to determine whether a passenger 320 is approaching the vehicle 300. Details regarding image processing algorithms are generally known in the art, and thus will not be discussed in detail herein.

As another example, information can be received from a mobile device (not shown) of the future passenger 320, and the ECU can determine whether the passenger 320 will enter the vehicle 300 based on the received information. In one scenario, the future passenger 320 can use an application installed on his mobile device to request and book a ride from the vehicle 300 (along with trip information such as pick-up location, drop-off location, pick-up time, etc.). The request can be relayed to the vehicle 300 indicating that the future passenger will enter the vehicle 300 at a future point in time.

As another example, a driver 330 of the vehicle 300 can manually provide input to indicate that a passenger 320 will enter the vehicle 300 in the future. For instance, the driver 330 can receive a new passenger pick-up request. The driver 330 can accept the pick-up request by providing input through a graphical user interface (GUI) or other input means provided in the vehicle, or through a mobile device belonging to the driver 330. The ECU can receive such input and determine that the future passenger 320 will enter the vehicle 300 at a future point in time, thus causing the procedure 200 to continue.

In response to determining that a future passenger 320 is expected to enter the vehicle 300, the procedure 200 can proceed to step 215 whereby the ECU can detect a current seat occupancy in the vehicle 300. On the other hand, if the ECU determines that the future passenger 320 is not expected to enter the vehicle 300 in the future, the procedure 200 can proceed to step 245 whereby procedure 200 ends.

Figure 3:
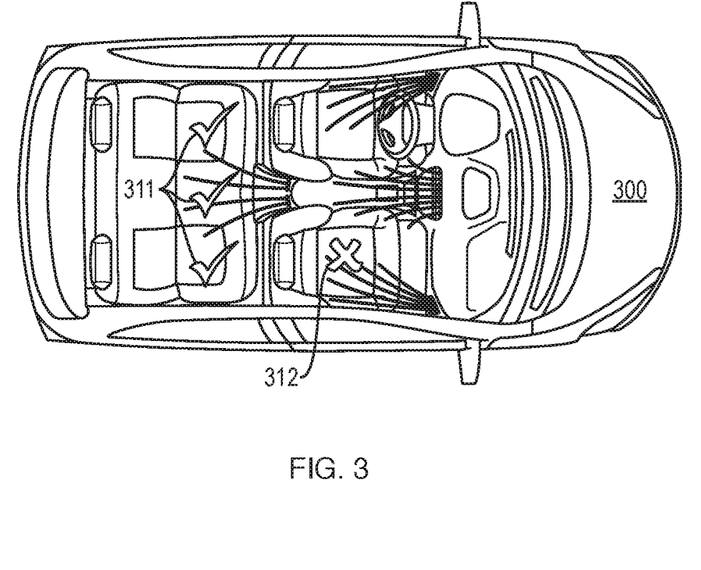
FIG. 3 is a top view of a current seat occupancy in a vehicle.

At step 215, the ECU can detect the current seat occupancy in the vehicle 300. The current seat occupancy can refer to the current arrangement of occupants and/or cargo inside the vehicle 300. An example current seat occupancy is illustrated in FIG. 3, which is a top view of a current seat occupancy in the vehicle 300. The seat occupancy can include a combination of unoccupied seats 311 and occupied seats 312, only unoccupied seats 311, or only occupied seats 312. As shown in FIG. 3, the current seat occupancy can include three unoccupied seats 311 in the rear row and one occupied seat 312 in the front row. The occupied seat 312 can be occupied by another passenger, cargo (e.g., a child car seat, a package, luggage, etc.), or any other object/obstruction. It can be assumed the driver seat is occupied by a driver 330, or, in the case of autonomous vehicles, for example, the driver seat may also be an unoccupied seat 311.

Therefore, in the example seat occupancy shown in FIG. 3, a future passenger 320 can sit in any seat in the rear row of the vehicle 300. The future passenger 320 cannot, however, sit in the front passenger seat of the vehicle 300, as the front passenger seat is detected as occupied.

The current seat occupancy of the vehicle 300 can be detected by the ECU using information measured by one or more of a plurality of sensors installed in the vehicle 300. A variety of different sensors can be employed to assist in detecting the current seat occupancy.

For example, the vehicle 300 can be equipped with seat occupancy sensors (not shown) installed in seats of the vehicle 300. Information measured by the seat occupancy sensors can indicate, for instance, a weight of an object, if any, positioned on a given seat. The ECU can use the measured information to detect whether seats of the vehicle 300 are occupied or unoccupied.

As another example, the vehicle 300 can be equipped with one or more cameras (not shown) mounted inside the vehicle 300. The one or more cameras can be positioned so as to acquire one or more images of an interior space of the vehicle 300 including the vehicle seats. The ECU can make a determination of whether the seats are occupied or unoccupied based on the acquired image(s). For instance, the ECU can employ an image processing algorithm on the acquired image(s) to determine whether or not the seats are occupied.

As another example, the vehicle 300 can be equipped with door sensors or door handle sensors. The door sensors or door handle sensors can be imbedded in a door or a door handle so as to sense whether a door of the vehicle 300 has been opened (or closed). The ECU can make a determination of whether a seat is occupied based on whether an adjacent door has been opened (or closed) according to the door sensors or door handle sensors.

Additionally, mobile devices belonging to passengers in the vehicle 300 can be utilized to detect the current seat occupancy of the vehicle 300. For instance, a current passenger 321 of the vehicle 300 can manually input the seat in which the passenger 321 is currently sitting using his mobile device. Alternatively, it can be possible for the ECU to utilize position information generated by the passenger's mobile device to detect the seat in which the passenger is sitting.

At step 220, the ECU can identify a seat 310 of the vehicle 300 for the future passenger 320 to occupy. The seat identification can be made by the ECU based on the current seat occupancy detected in step 215. For instance, in the example shown in FIG. 3, the ECU can identify any of the unoccupied seats 311 as the seat 310 for the future passenger 320 to occupy upon entering the vehicle 300.

The ECU can also identify a seat 310 for the future passenger 320 to satisfy an optimal future seat occupancy, which can be generated based on the current seat occupancy detected in step 215 and at least one additional parameter. In this regard, an optimal future seat occupancy can refer to a seating arrangement of current passengers 321 and/or cargo in the vehicle 300 including the future passenger 320, i.e., after the future passenger 320 has entered the vehicle (whereas the current seat occupancy refers to a seating arrangement of current passengers 321 prior to the future passenger 320 entering the vehicle 300). The optimal future seat occupancy can be generated with an objective of, for instance, optimizing pick-ups and drop-offs during each passenger's trip, increasing convenience and/or comfort, satisfying needs or preferences of the passengers or driver, minimizing inconvenience caused by traffic or weather conditions, and so forth. The optimal future seat occupancy can identify the seat of the vehicle 300 which the future passenger 320 should occupy.

Furthermore, the optimal future seat occupancy can identify a seat of the vehicle 300 for cargo belonging to the future passenger 320. For example, optimal future seat occupancy can identify a seat of the vehicle 300 for a passenger's car seat or booster seat (e.g., for an accompanied child), suitcase, and the like, such that the future passenger 320 sits next to or close by his or her cargo. In addition, the optimal future seat occupancy can identify a seat of the vehicle 300 for a future passenger 320 with special needs, such as a wheelchair-supportive seat. Unique requests of the future passenger 320, such as a seat for cargo, special needs, accompanied passengers (e.g., children), and so forth, can be communicated to a vehicle 300 ahead of time, e.g., from a mobile device (not shown) of the future passenger 320, in conjunction with a request for a ride from the vehicle 300 (along with trip information such as pick-up location, drop-off location, pick-up time, etc.).

Figure 9:
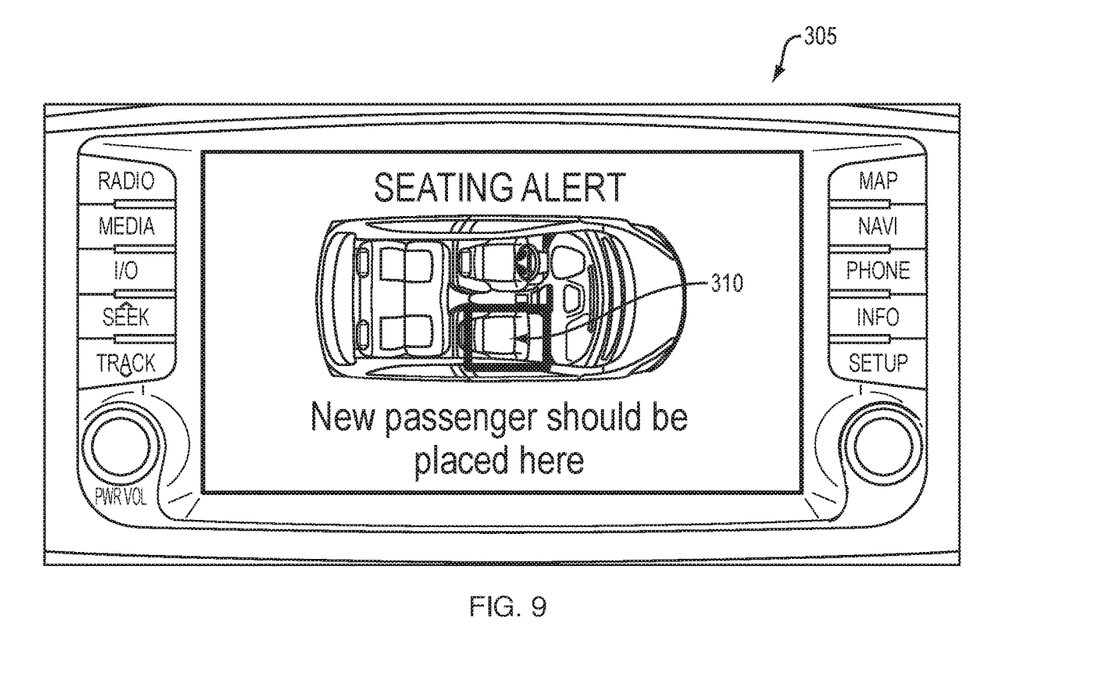
FIG. 9 is a view of an example graphical indication of an optimal future seat occupancy displayed by a display unit in a vehicle.

Once the ECU has generated the optimal future seat occupancy for the vehicle 300, an indication of the optimal future seat occupancy can be displayed via a display unit 305 installed in the vehicle 300. For instance, FIG. 9 is a view of an example graphical indication of an optimal future seat occupancy displayed by the display unit 305 in the vehicle 300. As shown in FIG. 9, the optimal future seat occupancy includes the identified seat 310 for the future passenger 320 to occupy upon entering the vehicle 300. The graphical indication displayed by the display unit 305 can contain an announcement or instruction for the future passenger 320 or other passengers indicating that the future passenger 320 should sit at the identified seat 310.

As noted above, the ECU can generate the optimal future seat occupancy based on a variety of parameters. In one example, the ECU can access information in a stored profile 360 of the future passenger 320, and generate the optimal future seat occupancy based on the accessed information. In detail, the future passenger 320 may have a profile 360 including various information such as personal information associated with the future passenger 320 including, e.g., height, weight, age, and so forth. The profile 360 can be stored on the mobile device of the future passenger 320, on a remote server (e.g., stored on the cloud), or on a memory equipped in the vehicle 300 itself. The profile 360 can be maintained automatically by a ride-sharing or car-pooling service provider, and/or maintained manually by the future passenger 320 uploading information to the profile 360. Other passengers or ride-sharing service users can also have stored profiles 360 which can be accessed for the purpose of generating the optimal future seat occupancy.

As an illustrative, non-limiting example, the profile 360 of the future passenger 320 may contain the following pieces of data shown below in Table 1.

| Criteria | Stored Profile Data |
|---|---|
| Height | 6'1" |
| Weight | 165 lbs. |
| Age | 33 |
| Loyalty Points | Silver status |
| Friendship with Passengers | Passenger_A; Passenger_B |
| Preference | Prefers front seat |

As another illustrative, non-limiting example, the ECU can interpret the stored profile data in the manner demonstrated below in Table 2 to determine whether the future passenger 320 should sit in a front seat or a back seat of the vehicle 300.

| Criteria | Front Seat Priority | Back Seat Priority |
|---|---|---|
| Height | Over 57" | 57" or less |
| Weight | Over 80 lbs. | 80 lbs. or less |
| Age | Over 13 years old | 13 years old or less |
| Loyalty Points | Gold/Silver status | Bronze status |

-continued

| Criteria | Front Seat Priority | Back Seat Priority |
| --- | --- | --- |
| Friendship with Passengers | 1 passenger alone | 2 or more friends in vehicle |
| Preference | Prefers front seat | Prefers back seat |

The ECU can access the stored profile data above, e.g., height, weight, age, or other pieces of profile data, for generating the optimal future seat occupancy. For instance, taller passengers can be assigned to the front seat where legroom is greater, children can be assigned to a back seat for safety reasons, "Gold" or "Silver" users can be assigned to the front seat as a reward for loyalty or frequent use, "Bronze" users can be assigned to a back seat, and so forth. As a result, the future passenger 320 can be assigned to a seat of the vehicle 300 based on the passenger's personal information, creating a more personalized and custom riding experience.

In another example, the ECU can determine a cost of the ride paid for by the future passenger 320, and utilize the ride cost to generate the optimal future seat occupancy. For instance, in a more expensive (e.g., longer) ride, the ECU can generate the optimal future seat occupancy such that the future passenger 320 rides in the front seat. Or, in a less expensive (e.g., shorter) ride, the ECU can generate the optimal future seat occupancy such that the future passenger 320 rides in a back seat.

In another example, the ECU can determine current traffic or road conditions, and utilize the traffic or road conditions to generate the optimal future seat occupancy. For instance, in a scenario where there is little or no traffic, or the speed limit is 25 mph or less, the ECU can generate an optimal future seat occupancy in which the future passenger 320 can enter the vehicle 300 curb-side (i.e., passenger-side) or street-side (i.e., driver-side). Conversely, in a scenario where there is heavy traffic, or the speed limit is greater than 25 mph, the ECU can generate an optimal future seat occupancy in which the future passenger 320 can only enter the vehicle 300 curb-side (i.e., passenger-side) for the safety of the passenger.

In another example, the ECU can determine current weather conditions, and utilize the weather conditions to generate the optimal future seat occupancy. For instance, in a scenario where there is heavy rain, wind, snow, etc., the ECU can generate an optimal future seat occupancy which the future passenger 320 with multiple options for entering the vehicle 300, as the passenger may be in a rush when approaching the vehicle 300 so as to avoid the inclement weather. Conversely, in a scenario where the weather is calm, the ECU can generate the optimal future seat occupancy in a standard manner (i.e., without special requirements).

In another example, the ECU can determine route data for each current passenger 321 of the vehicle 300, as well as the future passenger 320 (and any other future passengers). The ECU can then generate a trip schedule 370 based on the route data indicating an order of passenger pick-ups and drop-offs, and generate the optimal future seat occupancy based on the trip schedule.

Figure 7:
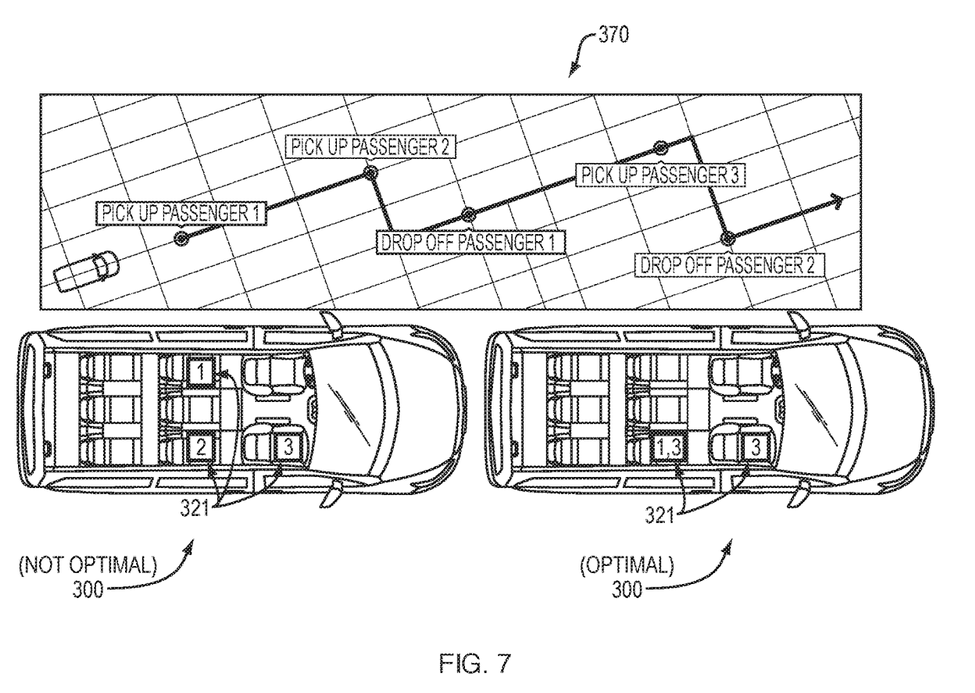
FIG. 7 is a diagrammatic view of a trip schedule and top views of a vehicle including an optimal future seat occupancy generated based on the trip schedule.

For instance, FIG. 7 is a diagrammatic view of an example trip schedule 370 and top views of the vehicle 300 including an optimal future seat occupancy generated based on the trip schedule 370. As shown in FIG. 7, the trip schedule 370 can include route data (e.g., pick-up location, drop-off location, navigation route, etc.) of each current passenger 321 and the future passenger 320 (and any other future passengers). More particularly, the trip schedule 370 can indicate the order of passenger pick-ups and drop-offs. For instance, in the non-limiting example illustrated in FIG. 7, the driver 330 can first pick-up Passenger 1, then pick-up Passenger 2, then drop-off Passenger 1, then pick-up Passenger 3, then drop-off Passenger 2, and so forth.

Generally speaking, it can be preferable for safety reasons for passengers to exit the vehicle 300 curb-side (i.e., passenger-side). Thus, referring to the example of FIG. 7, the vehicle 300 illustrated on the right includes the optimal future seat occupancy because each passenger (Passenger 1, Passenger 2, and Passenger 3) occupies a curb-side seat and can safely exit the vehicle 300 curb-side. In detail, according to the optimal future seat occupancy, Passenger 1 is picked-up first and can enter the vehicle 300 sitting in the curb-side rear seat. Passenger 2 is picked-up next and can enter the vehicle 300 sitting in the curb-side front seat. Then, Passenger 1 is dropped-off, leaving the curb-side rear seat empty. Passenger 3 is picked-up next and can enter the vehicle 300 sitting in the curb-side rear seat previously occupied by Passenger 1. Then, Passenger 2 is dropped-off, leaving the curb-side front seat empty. Notably, each passenger can safely exit the vehicle 300 curb-side. Conversely, had Passenger 2 entered the vehicle 300 through the rear door, Passenger 1 would have moved to the street-side (i.e., driver-side) rear seat, as shown in the vehicle 300 illustrated on the left, either causing Passenger 1 to unsafely exit the vehicle 300 street-side, or causing Passenger 2 to temporarily exit and then re-enter the vehicle 300 curb-side to allow Passenger 1 to exit the vehicle 300 curb-side.

In another example, the ECU can generate the optimal future seat occupancy based on a passenger location preference of the driver 330. For instance, the driver 330 might prefer passengers to occupy the rear seats of the vehicle 300, leaving the front seat empty. In such case, the ECU can generate the optimal future seat occupancy so as to leave the front seat empty if possible. Similarly, after the ECU has generated the optimal future seat occupancy, the driver 330 can have the option of modifying the optimal future seat occupancy. In this regard, the driver 330 can provide input through a GUI or other input means provided in the vehicle 300, or through a mobile device belonging to the driver 330, and the ECU can modify the optimal future seat occupancy based on the driver's input.

Figure 8:
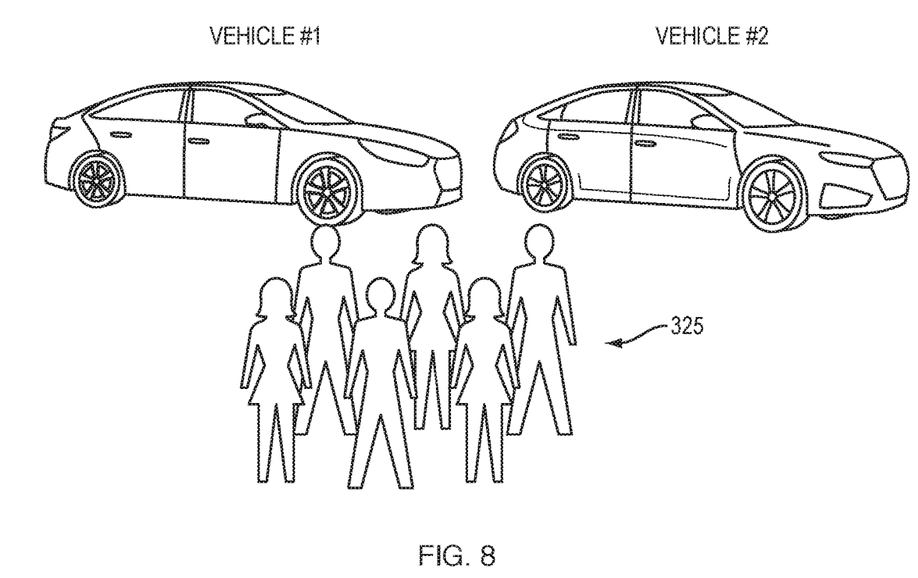
FIG. 8 is a diagrammatic view of a passenger pool and an optimal future seat occupancy being generated across multiple vehicles.

In yet another example, if the future passenger 320 is one of a plurality of future passengers 320, multiple vehicles can be necessary to transport the passengers, and therefore the optimal future seat occupancy can extend across multiple vehicles. For instance, FIG. 8 is a diagrammatic view of a passenger pool 325 and an optimal future seat occupancy being generated across multiple vehicles 330. In this scenario, the ECU can determine whether a first vehicle (i.e., Vehicle #1) is capable of seating the passenger pool 325. If the first vehicle is not capable of seating the passenger pool 325 on its own (i.e., due to a lack of seating), the ECU can request a second vehicle (i.e., Vehicle #2) to assist the first vehicle. Then, the ECU can generate the optimal future seat occupancy utilizing the total seating capacity of the first and second vehicles.

It is understood that each of the above examples for generating the optimal future seat occupancy are merely illustrative and thus non-limiting. Moreover, any of the parameters described above can be utilized in combination when generating the optimal future seat occupancy.

In addition to generating an optimal future seat occupancy to accommodate the future passenger 320, it may be beneficial to control a seating arrangement of the current passengers 321 prior to the future passenger 320 entering the vehicle 300. In this regard, the ECU can generate an optimal current seat occupancy for the current passengers 321 of the vehicle 300 before the future passenger 320 enters the vehicle. Similar to the optimal future seat occupancy, the optimal current seat occupancy can be generated with an objective of, for instance, optimizing pick-ups and drop-offs during each passenger's trip, increasing convenience and/or comfort, satisfying needs or preferences of the passengers or driver, minimizing inconvenience caused by traffic or weather conditions, and so forth. Also, the ECU can generate the optimal current seat occupancy in light of stored profile data of one or more current passengers 321 of the vehicle 300, similar to the manner in which the ECU can generate the optimal future seat occupancy in light of stored profile data of the future passenger 320.

Upon generating an optimal current seat occupancy, the ECU can determine whether the optimal current seat occupancy matches the current seat occupancy detected in step 215. If the optimal current seat occupancy matches the detected current seat occupancy, no further action by the ECU is necessary. However, if the optimal current seat occupancy does not match the detected current seat occupancy, the ECU can output a request to one or more current passengers 321 in the vehicle 300 to relocate within the vehicle 300 in accordance with the optimal current seat occupancy. For instance, the ECU can output the request to one or more current passengers 321 via one or more of speakers (not shown) installed in the vehicle 300 and the display unit 305.

At step 225, the ECU can detect whether the future passenger 320 is approaching the vehicle 300. If the future passenger 320 is approaching the vehicle 300, the procedure 200 can proceed to step 230 whereby one or more indicators can be provided to signal to the passenger 230 where to enter the vehicle 300, as described in greater detail below. Conversely, if the future passenger 320 is not detected as approaching the vehicle 300, the procedure 200 can proceed to step 245 whereby procedure 200 ends.

In one example, the ECU can determine whether the future passenger 320 is approaching the vehicle 300 by detecting whether the future passenger 320 is located within a predetermined distance (e.g., 20 feet, 15 feet, 10 feet, etc.) of the vehicle 300. The ECU can detect whether the future passenger 320 is located within the predetermined distance of the vehicle 300 in various ways. For instance, an image of a surrounding environment of the vehicle 300 can be acquired using one or more cameras (not shown) mounted on an exterior of the vehicle 300. The one or more cameras mounted on the vehicle 300 can include, for instance, a "surround-view" camera. The ECU can make a determination of whether the future passenger 320 is located within the predetermined distance of the vehicle 300 based on the acquired image(s). For instance, the ECU can employ an image processing algorithm on the acquired image(s) to determine whether the passenger 320 is located within the predetermined distance of the vehicle 300.

In another example, information can be received from a mobile device (not shown) of the future passenger 320, and the ECU can determine whether the passenger 320 is located within the predetermined distance of the vehicle 300 based on the received information. For instance, the mobile device of the future passenger 320 can send location information (e.g., global positioning satellite (GPS) information) indicating a location of the mobile device. The ECU can collect the location information and thereby detect whether the future passenger 320 is located within the predetermined distance of the vehicle 300.

At step 230, in response to determining that the future passenger 320 is approaching the vehicle 300, the ECU can control the vehicle 300 so as to provide a plurality of indicators, in any particular order, signaling to the future passenger 320 which door to use when entering the vehicle 300. As a result, the future passenger 320 can quickly and easily discern the optimal door 301 to use when entering the vehicle 300, minimizing effort on behalf of the future passenger 320 (e.g., resulting from having to inspect multiple vehicle doors for an available seat), and also minimizing inconvenience on behalf of the current passengers 321 (e.g., resulting from having to change seats amidst an ongoing trip).

Firstly, the ECU can unlock a door 301 of the vehicle 300 adjacent to the identified seat 310. The ECU can also lock doors 302 of the vehicle 300 other than the door 301 adjacent to the identified seat 310, so as to prevent the future passenger 320 from inadvertently opening the wrong door.

Figure 6:
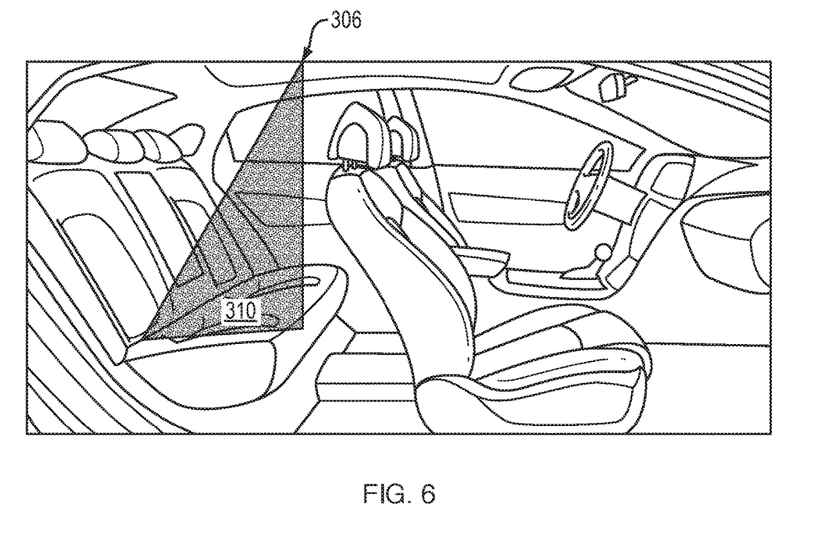
FIG. 6 is a side view of a vehicle including interior seating arrangement indicators.

Secondly, the ECU can activate one or more lights 306 of the vehicle 300 proximate to the identified seat 310. The one or more lights 306 can include a light coupled to the door 301 adjacent to the identified seat 310, a light coupled to a door handle of the door 301, and/or an interior light of the vehicle 300 proximate to the identified seat 310 (e.g., see FIG. 6).

Figure 4:
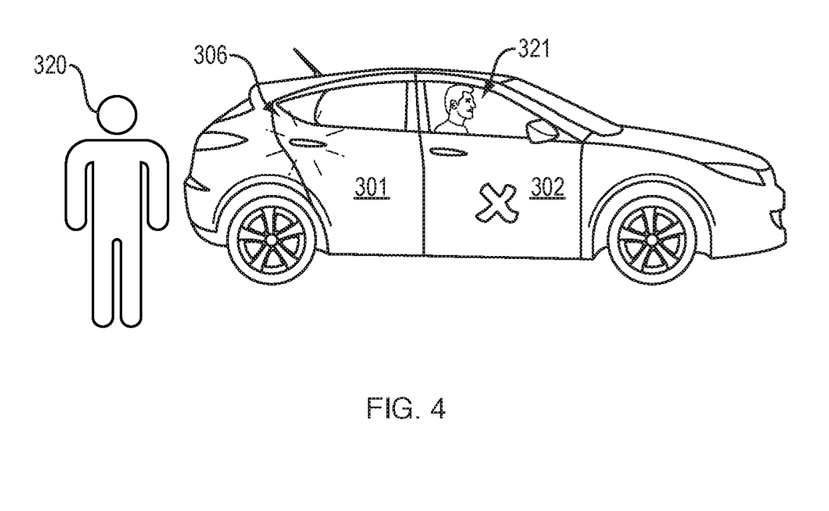
FIG. 4 is a side view of the vehicle including seating arrangement indicators based on the current seat occupancy of FIG. 3.

For example, FIG. 4 is a side view of the vehicle including seating arrangement indicators based on the current seat occupancy of FIG. 3. As shown in FIG. 4, the ECU has identified the rear passenger-side seat as the seat 310 for the future passenger 320 to occupy. Accordingly, the rear passenger-side door 301 can be unlocked by the ECU, and the remaining vehicle doors 302 can be locked. Also, the ECU can activate a light 306 coupled to the door handle of the door 301.

Figure 5A:
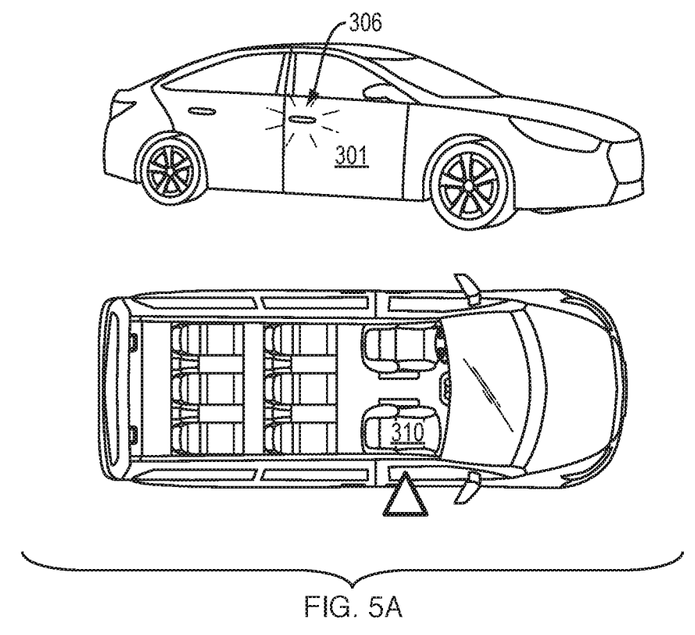
FIG. 5A is a top view of a front-row identified seat for a future passenger and a perspective view of the vehicle including seating arrangement indicators.

As another example, FIG. 5A is a top view of a front-row identified seat 310 for the future passenger 320 and a perspective view of the vehicle including seating arrangement indicators. Here, the ECU has identified the front passenger-side seat for the future passenger 320 to occupy according to the techniques described above. The ECU can unlock the front passenger-side door 301 which is adjacent to the identified seat 310, while locking the remaining doors 302. Also, the ECU can activate a light 306 proximate to the identified seat 310, such as a light mounted to the door 301, a light mounted to the handle of the door 301, or an interior light (e.g., dome light) proximate to the front passenger-side seat.

Figure 5B:
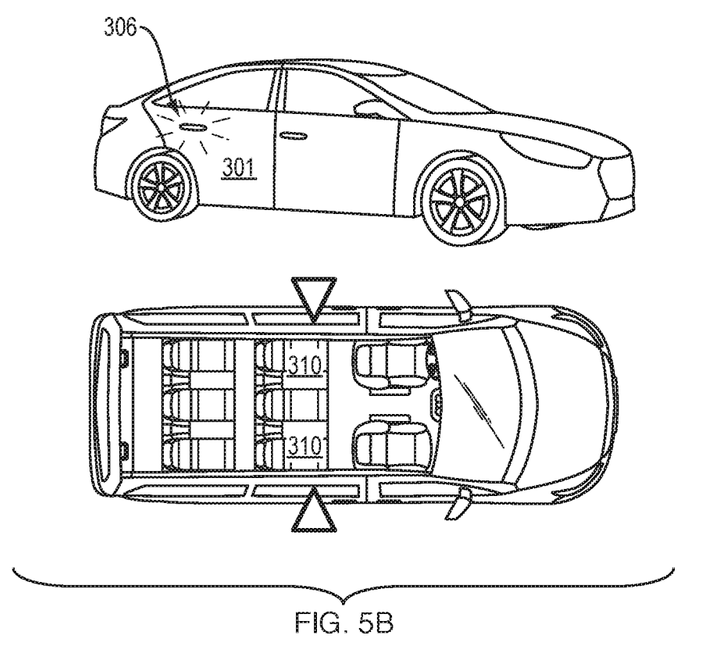
FIG. 5B is a top view of a rear-row identified seat for a future passenger and a perspective view of the vehicle including seating arrangement indicators.

As another example, FIG. 5B is a top view of a rear-row identified seat 310 for the future passenger 320 and a perspective view of the vehicle including seating arrangement indicators. Here, the ECU has identified the rear passenger-side and rear driver-side seats for the future passenger 320 to occupy according to the techniques described above. The ECU can unlock both the rear passenger-side door 301 and the rear driver-side door 301 which are each adjacent to the identified seats 310, while locking the remaining doors 302. Also, the ECU can activate lights 306 proximate to the identified seats 310, such as a light mounted to either of the doors 301, a light mounted to the handle of the doors 301, or an interior light (e.g., a dome light, a light mounted on the floor, a light mounted near the seat, etc.) proximate to the rear passenger-side or rear driver-side seats. Additionally, the ECU can activate other vehicle lights, such as headlights, side mirror lights, roofline lights, running board lights, and the like, in the same or similar manner.

The ECU can activate the light 306 proximate to the identified seat 310 in various ways. For example, the ECU can activate the light 306 so as to emit light of a predetermined first color. Conversely, the ECU can activate one or more lights 307 of the vehicle 300 other than the light 306 proximate to the identified seat 310 so as to emit light of a predetermined second color different from the first color. The one or more lights 307 other than the light 306 can be coupled to the vehicle doors 302, which can be locked by the ECU. As an example, the light 306 can emit a green light (i.e., "first color"), indicating that the future passenger 320 should open the door 301 adjacent to the light 306, while the one or more lights 307 can emit a red light (i.e., "second color"), indicating that the passenger 320 should not open doors 302.

Similarly, the ECU can activate the light 306 proximate to the identified seat 310 so as to emit light of a predetermined first pattern (e.g., flashing lights). Conversely, the ECU can activate the one or more lights 307 other than the light 306 so as to emit light of a predetermined second pattern (e.g., solid light, no light, etc.) different from the first pattern. Thus, the even if the light 306 and one or more lights 307 emit light of the same color, the lights can still be distinguished.

As another example, the stored profile 360 of the future passenger 320 can indicate a color associated with the passenger 320. The ECU can access the stored profile 360 of the future passenger 320 to determine the passenger's associated color, and activate the light 306 so as to emit light of the color indicated in the stored profile 360. Thus, the future passenger 320 can recognize the color being emitted by the light 306, and understand that he should enter the vehicle 300 through the door 301 proximate to the light 306.

The ECU can control the vehicle 300 so as to provide additional indicators for the future passenger 320, as well. For example, the ECU can cause an object, an icon, or the like which is only visible using augmented reality to be displayed in association with the door 301 adjacent to the identified seat 310. In one scenario, the future passenger 320 can utilize an augmented reality-enabled application on a mobile device to view the object, icon, or the like, associated with the door 301, thus being notified of the appropriate door through which to enter the vehicle 300, without actual light being emitted from the vehicle.

After providing the indicators described above, the procedure 200 can continue to step 235 whereby the ECU can determine whether the future passenger 320 has entered the vehicle 300. The ECU can make the determination of whether the future passenger 320 enters the vehicle 300 using information from any of the sensors described hereinabove, including, for example, a door sensor, a door handle sensor, a camera, and the like. The ECU can also rely on information from the mobile device of the future passenger 320 or information manually provided by the driver 330.

If the ECU detects that the future passenger 320 enters the vehicle 300 using a door other than the door 301 adjacent to the identified seat 310, the ECU can issue a warning to the passenger 320. For example, a warning message can be outputted to the future passenger 320 via a speaker installed in the vehicle 300. The warning message can inform the future passenger 320 that the door being opened is incorrect (e.g., "this seat is taken") and/or inform the future passenger 320 of the correct door.

If the ECU detects that the future passenger 320 enters the vehicle 300 using the correct door 301 and/or that the future passenger 320 is occupying the identified seat 310, the procedure 200 can proceed to step 240 whereby the ECU can lock the door 301 adjacent to the identified seat 310 and deactivate the light 306 proximate to the identified seat 310. The ECU can also perform step 240 when the driver 330 of the vehicle 300 begins to drive. Conversely, if the ECU does not detect that the future passenger 320 has entered the vehicle 300 within a predetermined time (e.g., 10 seconds, 20 seconds, 30 seconds, etc.), the ECU can determine that the future passenger 320 is not entering the vehicle. In such case, the ECU can lock the door 301 adjacent to the identified seat 310 and deactivate the light 306 proximate to the identified seat 310. If the ECU later detects the future passenger 320 approaching the vehicle (e.g., step 225), the ECU can repeat steps 230 through 240.

Also, after detecting that the future passenger 320 has entered the vehicle 300, using techniques described above, the ECU can update the stored profile 360 of the future passenger 320 so as to reflect that the future passenger 320 occupied the identified seat 310. The profile 360 of the future passenger 320 can, for instance, record a history of seats occupied by the passenger 320, and the ECU can utilize such information (e.g., detecting seat trends) when identifying a seat for the passenger 320 in a future ride.

The procedure 200 illustratively ends at step 245. The techniques by which the steps of procedure 200 may be performed, as well as ancillary procedures and parameters, are described in detail above.

It should be noted that the steps shown in FIG. 2 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Even further, the illustrated steps may be modified in any suitable manner in accordance with the scope of the present claims.

Accordingly, the systems and methods for controlling a vehicle seating arrangement described herein can quickly and intuitively inform a passenger of an optimal vehicle door to enter when the vehicle arrives to pick-up the passenger. Moreover, passengers can be arranged within the vehicle in a manner allowing for efficient entry and exit throughout each passenger's trip. The systems and methods described herein can be particularly beneficial for ride-sharing or car-pooling services which provide rides for multiple passengers; however, applicability of the described systems and methods is not limited thereto.

The foregoing description has been directed to embodiments of the present disclosure. It will be apparent, however, that other variations and modifications may be made to the described embodiments, with the attainment of some or all of their advantages. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method for controlling a vehicle seating arrangement comprising:
   detecting a current seat occupancy in a vehicle using a plurality of sensors installed in the vehicle;
   identifying a seat of the vehicle for a future passenger to occupy based on the detected current seat occupancy;

unlocking, by an electronic control unit (ECU), a door of the vehicle adjacent to the identified seat;
activating, by the ECU, a light of the vehicle proximate to the identified seat;
generating an optimal future seat occupancy in the vehicle based on the current seat occupancy and at least one additional parameter;
identifying the seat for the future passenger to occupy based on the optimal future seat occupancy,
wherein the generating of the optimal future seat occupancy comprises:
  accessing a stored profile of the future passenger including personal information of the future passenger; and
  generating the optimal future seat occupancy based on information in the profile of the future passenger selected from a group consisting of: a height of the future passenger, a weight of the future passenger, an age of the future passenger, a gender of the future passenger, a riding preference of the future passenger, a friendship of the future passenger with another passenger in the vehicle, and loyalty points of the future passenger;
prior to the future passenger entering the vehicle, generating an optimal current seat occupancy in the vehicle based on at least one parameter; and
when the detected current seat occupancy does not match the optimal current seat occupancy, outputting a request to one or more passengers in the vehicle via one or more of speakers installed in the vehicle and a display unit installed in the vehicle to relocate within the vehicle in accordance with the optimal current seat occupancy, wherein the generating of the optimal current seat occupancy comprises:
  accessing one or more stored profiles of one or more passengers in the vehicle including personal information of the one or more passengers; and
  generating the optimal current seat occupancy based on information in the one or more profiles of the one or more passengers.

2. The method of claim 1, wherein the generating of the optimal future seat occupancy further comprises:
determining one or more seating parameters including a ride cost paid for by the future passenger, a current traffic or road condition, a current weather condition, and a passenger location preference of a driver of the vehicle; and
generating the optimal future seat occupancy based on the one or more seating parameters.

3. The method of claim 1, wherein the generating of the optimal future seat occupancy further comprises:
determining route data for each current passenger in the vehicle and one or more future passengers;
generating a trip schedule based on the route data, the trip schedule indicating an order of passenger pick-ups and drop-offs; and
generating the optimal future seat occupancy based on the trip schedule such that a passenger among each current passenger and the one or more future passengers being dropped off next according to the trip schedule is located in a seat adjacent to a curbside door of the vehicle.

4. The method of claim 1, further comprising:
receiving an indication of a desired seat occupancy from a driver of the vehicle;
modifying the optimal future seat occupancy in accordance with the desired seat occupancy; and
displaying the indication of the optimal future seat occupancy via a display unit installed in the vehicle.

5. The method of claim 1, wherein, when the future passenger is one of a plurality of future passengers, the generating of the optimal future seat occupancy comprises:
determining whether the vehicle is capable of seating the plurality of future passengers;
in response to determining that the vehicle is not capable of seating the plurality of future passengers, requesting a second vehicle to assist the vehicle; and
generating the optimal future seat occupancy based on a total seating capacity of the vehicle and the second vehicle.

6. The method of claim 1, further comprising:
locking, by the ECU, doors of the vehicle other than the door adjacent to the identified seat.

7. The method of claim 1, wherein the activating of the light comprises one or more of:
activating, by the ECU, a light coupled to a door handle of the door adjacent to the identified seat;
activating, by the ECU, an interior light of the vehicle proximate to the identified seat;
activating, by the ECU, the light so as to emit light of a predetermined first color;
activating, by the ECU, one or more lights of the vehicle other than the light proximate to the identified seat so as to emit light of a predetermined second color different from the first color;
activating, by the ECU, the light so as to emit light of a color indicated in a stored profile of the future passenger; and
activating, by the ECU, the light so as to emit light of a predetermined first pattern in conjunction with one or more lights of the vehicle other than the light proximate to the identified seat so as to emit light of a predetermined second pattern different from the first pattern.

8. The method of claim 1, further comprising:
performing a step selected from a group consisting of: acquiring an image of a surrounding environment using a camera mounted on an exterior of the vehicle, receiving information from a mobile device of the future passenger, and receiving input from a driver of the vehicle;
determining whether the future passenger will enter the vehicle at a future point in time based on the performed step; and
detecting the current seat occupancy in the vehicle in response to determining that the future passenger will enter the vehicle at the future point in time.

9. The method of claim 1, wherein the detecting of the current seat occupancy comprises one or more of:
detecting whether seats of the vehicle are occupied by passengers and whether the seats are occupied by cargo;
detecting whether seats of the vehicle are occupied using information received from one or more mobile devices of one or more passengers of the vehicle;
detecting whether seats of the vehicle are occupied using information received from seat occupancy sensors installed in the seats of the vehicle;
detecting whether seats of the vehicle are occupied using information received from cameras mounted in the vehicle; and
detecting whether seats of the vehicle are occupied using information received from door handle sensors installed in the vehicle.

10. The method of claim 1, further comprising:
detecting whether the future passenger has entered the vehicle using the plurality of sensors; and
after detecting the future passenger has entered the vehicle:
  locking, by the ECU, the door adjacent to the identified seat, and
  deactivating, by the ECU, the light proximate to the identified seat.

11. The method of claim 1, further comprising:
detecting whether the future passenger has entered the vehicle using the plurality of sensors; and
when a predetermined time elapses without detecting the future passenger has entered the vehicle:
  locking, by the ECU, the door adjacent to the identified seat, and
  deactivating, by the ECU, the light proximate to the identified seat.

12. The method of claim 1, further comprising:
displaying an indication of the identified seat via a display unit installed in the vehicle.

13. The method of claim 1, further comprising:
detecting whether the future passenger has opened a door of the vehicle other than the door adjacent to the identified seat; and
in response to detecting the future passenger has opened the door other than the door adjacent to the identified seat, outputting a warning message to the future passenger via a speaker installed in the vehicle.

14. The method of claim 1, further comprising:
detecting whether the future passenger has entered the vehicle using the plurality of sensors; and
after detecting the future passenger has entered the vehicle, updating a stored profile of the future passenger so as to reflect that the future passenger occupied the identified seat.

15. The method of claim 1, further comprising:
detecting whether the future passenger is located within a predetermined distance of the vehicle; and
in response to detecting that the future passenger is located within the predetermined distance:
  unlocking, by the ECU, the door adjacent to the identified seat; and
  activating, by the ECU, the light proximate to the identified seat,
wherein the detecting whether the future passenger is located within the predetermined distance comprises:
acquiring an image of a surrounding environment using a camera mounted on an exterior of the vehicle or receiving information from a mobile device of the future passenger; and
detecting whether the future passenger is located within the predetermined distance based on the acquired image or the received information.

16. A system for controlling a vehicle seating arrangement comprising:
a vehicle including a plurality of seats and a plurality of lights;
a plurality of sensors installed in the vehicle; and
at least one electronic control unit (ECU), one or more ECUs of the at least one ECU configured to:
detect a current seat occupancy in the vehicle using information sensed from the plurality of sensors;
identify a seat of the vehicle for a future passenger to occupy based on the detected current seat occupancy;
unlock a door of the vehicle adjacent to the identified seat;
activate a light of the vehicle proximate to the identified seat;
prior to the future passenger entering the vehicle, generate an optimal current seat occupancy in the vehicle based on at least one parameter; and
when the detected current seat occupancy does not match the optimal current seat occupancy, output a request to one or more passengers in the vehicle via one or more of speakers installed in the vehicle and a display unit installed in the vehicle to relocate within the vehicle in accordance with the optimal current seat occupancy,
wherein to generate the optimal current seat occupancy, the at least one ECU is configured to:
  access one or more stored profiles of one or more passengers in the vehicle including personal information of the one or more passengers; and
  generate the optimal current seat occupancy based on information in the one or more profiles of the one or more passengers.

17. A non-transitory computer readable medium containing program instructions for controlling a vehicle seating arrangement, the program instructions when executed by at least one electronic control unit (ECU) causing the at least one ECU to:
detect a current seat occupancy in the vehicle using information sensed from a plurality of sensors installed in a vehicle;
identify a seat of the vehicle for a future passenger to occupy based on the detected current seat occupancy;
unlock a door of the vehicle adjacent to the identified seat;
activate a light of the vehicle proximate to the identified seat;
prior to the future passenger entering the vehicle, generate an optimal current seat occupancy in the vehicle based on at least one parameter; and
when the detected current seat occupancy does not match the optimal current seat occupancy, output a request to one or more passengers in the vehicle via one or more of speakers installed in the vehicle and a display unit installed in the vehicle to relocate within the vehicle in accordance with the optimal current seat occupancy,
wherein to generate the optimal current seat occupancy, the at least one ECU is configured to:
  access one or more stored profiles of one or more passengers in the vehicle including personal information of the one or more passengers; and
  generate the optimal current seat occupancy based on information in the one or more profiles of the one or more passengers.

* * * * *